US012536333B2

(12) United States Patent
Joshi et al.

(10) Patent No.: US 12,536,333 B2
(45) Date of Patent: Jan. 27, 2026

(54) TELEMETRY DATA PROTECTION FOR SOFTWARE APPLICATIONS

(71) Applicant: Microsoft Technology Licensing, LLC, Redmond, WA (US)

(72) Inventors: Dhruv Joshi, Kirkland, WA (US); Inshuya Muthukumar, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 482 days.

(21) Appl. No.: 18/068,335

(22) Filed: Dec. 19, 2022

(65) Prior Publication Data
US 2024/0202370 A1   Jun. 20, 2024

(51) Int. Cl.
*G06F 21/62*   (2013.01)

(52) U.S. Cl.
CPC ...... *G06F 21/6263* (2013.01); *G06F 21/6209* (2013.01); *G06F 21/6254* (2013.01)

(58) Field of Classification Search
CPC ............ G06F 21/6263; G06F 21/6209; G06F 21/6254
See application file for complete search history.

(56) References Cited

U.S. PATENT DOCUMENTS

2010/0223276 A1* 9/2010 Al-Shameri ........... G06V 20/13
707/769

OTHER PUBLICATIONS

Ren et al. "LoPub: High-Dimensional Crowdsourced Data Publication With Local Differential Privacy", 2018, pp. 2151-2166, IEEE Transactions on Information Forensics and Security vol. 13, Issue: 9 (Year: 2018).*
International Search Report and Written Opinion received for PCT Application No. PCT/US23/035748, Feb. 27, 2024, 13 pages.
Ren, et al., "LoPub: High-Dimensional Crowdsourced Data Publication with Local Differential Privacy," IEEE Transactions on Information Forensics and Security, vol. 13, Issue 9, Mar. 5, 2018, pp. 2151-2166.
Wang, et al., "A Comprehensive Survey on Local Differential Privacy toward Data Statistics and Analysis," Sensors, vol. 20, Issue 24, Dec. 8, 2020, pp. 1-48.
International Preliminary Report on Patentability (Chapter I) received for PCT Application No. PCT/US23/035748, mailed on Jul. 3, 2025, 8 pages.

* cited by examiner

*Primary Examiner* — Hee K Song

(57) ABSTRACT

A multi-dimensional representation of an electronic document is generated which includes values that are indicative of characteristics of the document. From the multi-dimensional representation, a reduced dimension representation is generated by converting the values to a single value. A noisy representation of the reduced dimension representation is generated by at least modifying a portion of the single value. Telemetry data is then generated based on the noisy representation of the electronic document and sent to a telemetry service.

20 Claims, 7 Drawing Sheets

TELEMETRY DATA PROTECTION FOR SOFTWARE APPLICATIONS

TECHNICAL FIELD

Aspects of the disclosure are related to a system for protecting telemetry data of documents of software applications.

BACKGROUND

Software developers collect substantial quantities of data relating to real-world use of software applications to understand how users use the applications and to improve their utility. However, collecting data relating to real-world usage creates a risk that the data could be misused. A common concern associated with so-called "big data" comprising multiple correlated metrics is that a user or other entity associated with the data may be identifiable from patterns extracted from the data. Thus, data collection must be safeguarded from revealing confidential information should it fall into adversarial hands. Additionally, data collection must comply with the various regulations concerning data privacy, such as the GDPR, HIPAA, CCPA, and the like.

Implementing privacy protections in data collection is often at odds with gathering insights from the data. Software developers must balance a need for data fidelity with minimizing any potential for misuse. Differential privacy methods are used to limit disclosure of private information in databases, for example, by adding controlled noise to the data, but these methods, which protect the confidentiality of the source by allowing for the plausible denial of any individual data value, also reduce the sensitivity of the data.

OVERVIEW

Technology disclosed herein describes systems, devices, and methods for generating a multi-dimensional representation of an electronic document. The multi-dimensional representation includes values which are indicative of characteristics of the electronic document. A reduced dimension representation of the electronic document is generated based at least on converting the values to a single value. A noisy representation of the electronic document is generated by at least modifying a portion of the single value. Telemetry data is generated based at least on the noisy representation of the electronic document and is sent to a telemetry service.

In some implementations, generating the reduced dimension representation includes converting the values which are indicative of the characteristics of the electronic document to subset identifiers of reduced resolution. Converting the values into subset identifiers includes, for each value, identifying a subset of values to which the value belongs and converting the value to the subset identifier that is indicative of the subset.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
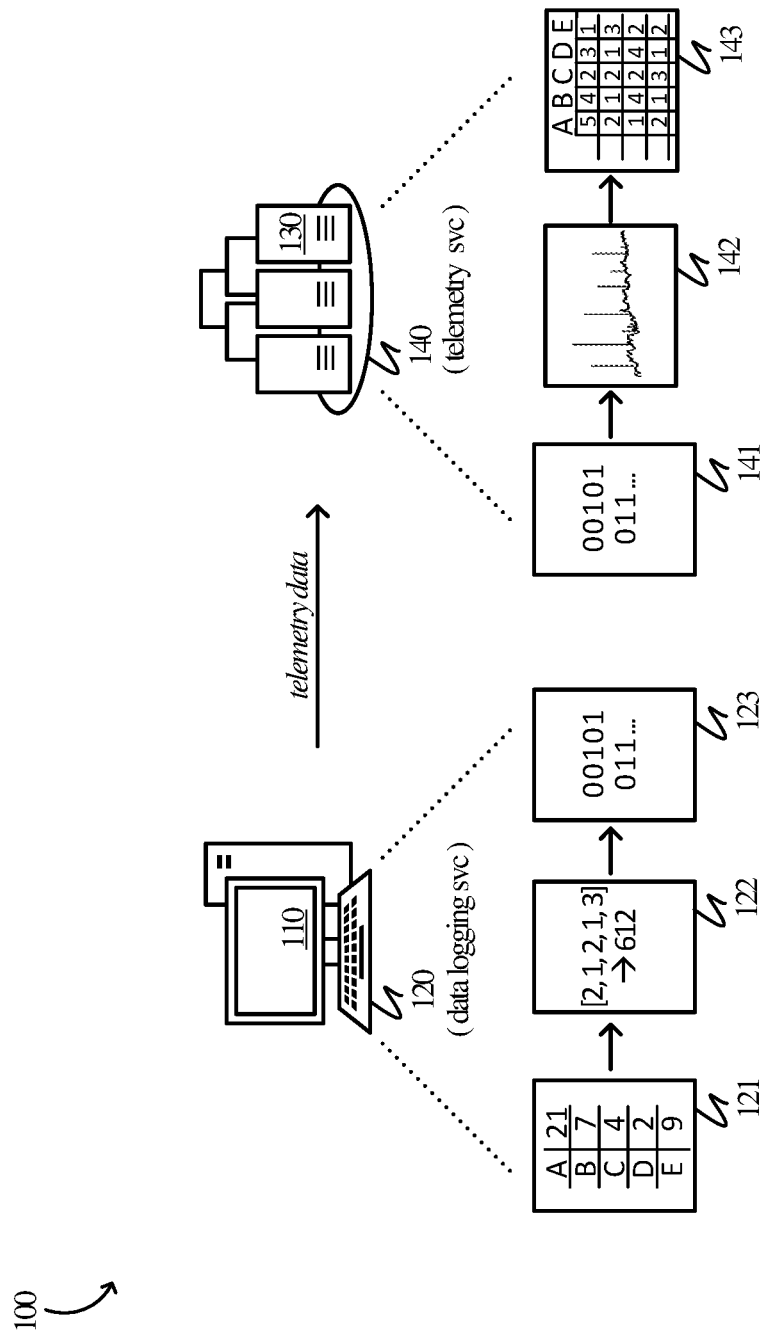
FIG. 1 illustrates an operational architecture in an implementation.

Technology disclosed herein describe systems, methods, and devices for sending telemetry data comprising a representation of characteristics of an electronic document. In an implementation, a service operating on computing device generates a multi-dimensional representation of an electronic document which includes values that are indicative of characteristics of the document. From the multi-dimensional representation, the service generates a reduced dimension representation by converting the values to a single value. The service then generates a noisy representation of the single value and sends telemetry data based at least on the noisy representation to a telemetry service.

In various implementations, the technology disclosed safeguards the privacy of users of computer applications when telemetry data for those applications is collected for analysis. In an implementation, a service executing on a client device collects and configures data for an electronic document for transmission to a telemetry service. The document may be, for example, a word processing document, a spreadsheet, a slide presentation, or other document relating to a productivity application. The data includes values corresponding to document attributes, such as the number of pages, the number of comments, hyperlinks, or tables in the document, or the number of coauthors, the number of rows or columns in use in a spreadsheet, the number of pivot tables, or to user activity, for example, the number of times that a user clicked "bold" or made some other type of edit in a session, the number of deletions of more than, say, five words, the number of corrections made that were prompted by the application, and so on. Collecting the data may be triggered by an event occurring with respect to a document, such as the document being opened, the user performing a particular action, the document being saved, or other action by the software application or the user.

When a document dataset is collected, each of the data values or metrics contained within the dataset are sorted into subsets of values. In an implementation, the subsets are mutually exclusive and defined according to boundary values between the subsets. For example, for a metric corresponding to the number of pages of a document, the subsets may be "0-9," "10-19," "20-29," and "30+," (the last class being open-ended). In some implementations, the subsets may also be serially numbered for identification. For example, the subsets are numbered 1 through 4 or are identified by the lowest value in the range of the subset: 0, 10, 20, 30. In sorting the data values into the subsets, however, some measure of accuracy or insight into the data may be lost, but the reduced resolution of the data is essentially traded for enhancing the privacy of the users or other entities associated with the data.

Continuing with the data configuration process, every possible combination of subsets or subset identifiers is assigned a unique, reduced dimension representation. In various implementations, the reduced dimension representation is a single value, such as a binary representation or hashed value, which both protects the document data from being accessible to unintended recipients and reduces the amount of data that must be transferred.

In an implementation, to generate a reduced dimension representation for a given combination, the given combination is encoded as a binary representation by assigning every possible combination of subsets to a position in a binary string, then setting a position corresponding to the given combination to a "1" and all other positions to "0." For example, for a combination of five metrics, each of which has four possible subsets associated with it, there are a total of $4^5$ or 1024 possible subset combinations. Thus, a 1024-bit string can be used to uniquely identify each combination. In an implementation, the service performing the data collection and configuration may maintain a look-up table which maps each combination to a position in the binary string. Alternatively, the service first determines for the given combination a unique intermediate value or combination identifier which maps to a position in the binary string. In still other implementations, the combination identifier or binary string position may be determined algorithmically based on the subset identifiers in the combination.

In some implementations, a given combination of subsets or subset identifiers may be uniquely identified by a combination identifier which is converted to a binary number. Continuing with the preceding example, if the combination of subsets corresponds to an intermediate value or identifier of 612 of the 1024 combinations, the combination will be uniquely represented by the binary (base-2) representation of 612, or 01001100100.

In still other implementations, the reduced dimension representation of a combination of subsets or subset identifiers is a value hashed from a combination identifier or from the subsets or subset identifiers of the combination and then converted to a binary representation. By transmitting a reduced dimension representation of the combination to the telemetry service rather than the subsets themselves, less data is transmitted, reducing the associated cost of transmission.

Upon receiving the reduced dimension representation, the telemetry service decodes the representation to retrieve the unique combination identifier and/or extract the subsets of the combination. With the subsets of the dataset correlated according to their respective combinations, the subsets of the data may be analyzed, for example, to identify correlations between the metrics or distributions in the data values according to various parameters.

In various implementations, the privacy of the telemetry data is further safeguarded by differential privacy methods applied locally, such as adding noise to the binary or other reduced representation of the combination prior to sending the representation to the telemetry service. For example, after a combination identifier is encoded in a binary representation, elements of the binary representation are randomly flipped according to known probability. Upon receiving the randomized or "noisy" representation, the telemetry service suppresses or filters out the added noise by aggregating the representation with other (noisy) representations. In some implementations, the telemetry service uses the known probabilities by which elements of the representations were flipped to extract the combinations from the noise. Once the combination identifier is decoded or extracted from the noisy representation, the telemetry service extracts the subsets of the combination associated with the document dataset. With the subsets correlated by combination, the data may be analyzed, for example, to identify correlations between the metrics or data distributions according to various parameters.

In some implementations, adaptive techniques are used to define or redefine the subsets of a given metric according to the range of values of the metric that is discovered when data is collected. When a substantial portion of the values fall within one subset, the telemetry service may redefine the boundary values for the subsets to provide a finer resolution of the data. For example, if 90% of the combinations contain subset "0-9" for, say, the number of tables within the corresponding documents, the telemetry service may redefine the boundary values to break up the subset for that metric into subsets with smaller ranges, such as "0-3," "4-6," and "7-9." The telemetry service transmits the updated subset definitions or boundary values in a software update to the service executing on the various client devices which queries the population to collect and configure (or reconfigure) document data and sends the associated telemetry data to the telemetry service.

Turning now to the figures, FIG. 1 illustrates operational architecture 100 for the various telemetry data processes disclosed herein in an implementation. Operational architecture 100 includes data logging service 120 executing on client computing device 110. Data logging service 120 is in communication with telemetry service 140 executing on server computer 130. Various processes of data logging service 120 are illustrated in views 121, 122, and 123. Various processes of telemetry service 140 are illustrated in views 141, 142, and 143.

Data logging service 120 is representative of one or more computing services capable of interacting with telemetry service 140. Data logging service 120 includes services capable of collecting data relating to a document or file of an application executing on client computing device 110, including various subservices or subprocesses relating to configuring, processing, and transmitting data and interacting with telemetry services such as telemetry service 140.

Figure 7:
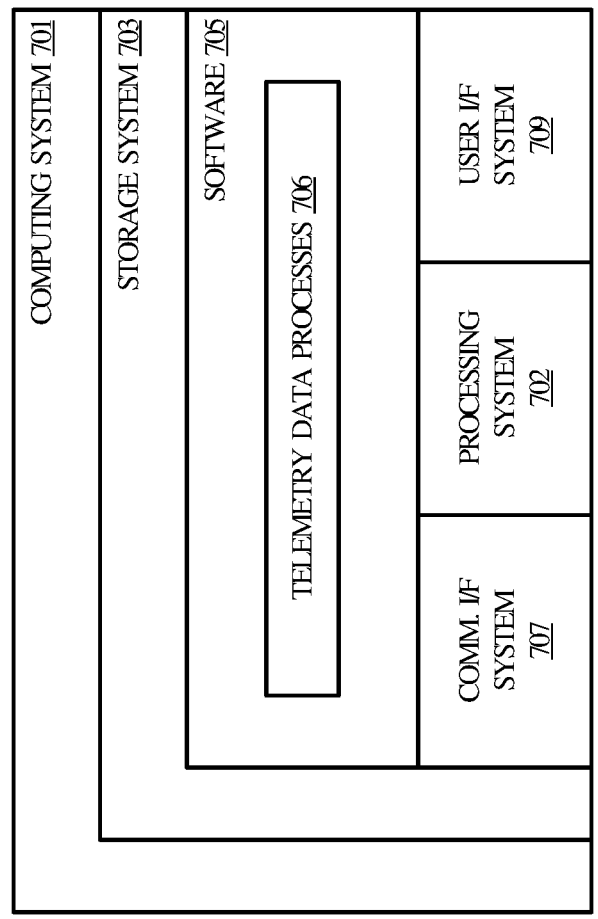
FIG. 7 illustrates a computing system suitable for implementing the various operational environments, architectures, processes, scenarios, and sequences discussed below with respect to the other Figures.
Figure 7:
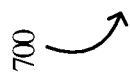

Computing device 110 is representative of computing devices, such as laptops or desktop computers, or mobile computing devices, such as tablet computers or cellular phones, of which computing device 701 in FIG. 7 is broadly representative. Computing device 110 communicates with telemetry service 140 executing on server computer 130 via one or more internets and intranets, the Internet, wired or wireless networks, local area networks (LANs), wide area networks (WANs), and any other type of network or combination thereof. Computing device 110 executes data logging service 120 for collecting data relating to a document or file of an application executing on computing device 110.

Telemetry service 140 is representative of one or more computing services capable of interacting with data logging service 120. Telemetry service 140 includes services capable of receiving telemetry data relating to one or more documents or files of applications executing on client devices, such as computing device 110, including various subservices or subprocesses relating to processing and analyzing the telemetry data and interacting with data logging services such as data logging service 120. Telemetry service 140 may be implemented in the context of one or more server computers co-located or distributed across one or more data centers of which server computer 130 is representative.

Server computer 130 is representative of one or more server computers co-located or distributed across one or more data centers. Examples of such servers include web servers, application servers, virtual or physical (bare metal) servers, or any combination or variation thereof, of which computing device 701 in FIG. 7 is broadly representative, and usually in the context of one or more data centers that include other equipment such as switches, routers, and storage devices that function together to provide telemetry service 140. Telemetry service 140 may be hosted "in the cloud," whether it be an on-premises cloud, a third-party cloud, or a hybrid cloud distributed between on-prem and off-prem clouds.

Views 121, 122, and 123 illustrate operations of data logging service 120 in an implementation. In view 121, data logging service 120 collects data associated with a document or file open in an application executing on computing device 110. In operation, data logging service 120 collects data for the document and generates a multi-dimensional representation of the document, the dimensions of which correspond to characteristics of the document, such as document attributes or application or user activity on or within the document. The data collected may be numerical values (such as integers, ordinals, or rational numbers) or other types of data such as Boolean values, time or date information, or application version numbers. The precision of the numerical values may vary according to the metric. In various implementations, data logging service 120 may strip out extraneous document metadata as well as any personal identifying information (PII) of the document data.

For each of the metrics A-E for which data are collected, data logging service 120 identifies a subset of values from among multiple subsets for the metric according to the data value of the metric. The multiple subsets are mutually exclusive with respect to each other and include a subset of values from the range of all possible values of the metric. For example, a metric which quantifies the number of hyperlinks in the document may range in value from 0 to more than, say, 100, and subsets for the metric may be defined as "0-9," "10-19," "20-29," and so on up to "100 or more." In various implementations, each subset is uniquely identified by serially numbering each subset (i.e., 1, 2, 3, and so on) or by using the greatest or least value in each subset.

In view 122, as subsets are selected for each data value in the document dataset, data logging service 120 generates a multi-dimensional representation of the dataset by creating a combination of the subset identifiers for each of the selected subsets. The combination may be a multi-dimensional vector (e.g., "[2, 1, 2, 1, 3]"), with each dimension corresponding to a metric, or by concatenating the subset identifiers to form a combination identifier. In some implementations, the combination of subsets or subset identifiers maps to a combination identifier (e.g., "612") which uniquely identifies every possible combination of subsets or subset identifiers of the metrics.

Having sorted each data value of the document data into a subset, data logging service 120 converts the combination identifier into a binary representation. In an implementation, the binary representation is a string of binary values, with each position of the string corresponding to a combination of subsets or subset identifiers. The position corresponding to the identifier of the combination is set to "1" and all the other positions of the string are set to "0."

In view 123 of FIG. 1, noise is added to the binary string representing the combination of subsets by pseudo-randomly flipping some of the positions in the binary string from "0" to "1" according to a known or predetermined probability. The position corresponding to the combination identifier (i.e., corresponding to the combination of subset identifiers) is not flipped. Data logging service 120 sends the randomized or noisy representation to telemetry service 140. Adding noise to the binary string obscures and therefore enhances protection of the privacy of the collected data.

In view 141 of FIG. 1, telemetry service 140 receives the noisy representation of the document data collected by data logging service 120. In an implementation, telemetry service 140 extracts the combination identifier by aggregating the noisy representation received from data logging service 120 with other similarly configured noisy representations transmitted by various computing devices executing instances of data logging service 120, which may include computing device 110 transmitting noisy representations at other times. In an implementation, to aggregate the noisy representations, telemetry service 140 sums, for each position in the binary string, the binary values of the noisy representations at the position. In other words, telemetry service 140 calculates a first sum of all the binary values at the first position, a second sum of all the binary values at the second position, a third sum of all the binary values at the third position, and so on for all the positions of the binary strings. For example, if the noisy representations received by telemetry service 140 have 1024 positions, telemetry service 140 will generate 1024 sums, each one corresponding to a position on the binary strings. Having generated an aggregate sum for each position of the binary strings, telemetry service 140 identifies positions which exceed a threshold value as being positions which are representative of actual or true reduced dimension representations (and not the result of random flipping).

In view 142, telemetry service 140 identifies multiple true reduced dimension representations from among multiple noisy representations (including the noisy representation illustrated in view 141). For example, as illustrated in view 142, each spike represents a frequency of occurrence of a "1" exceeding some threshold value at particular position on the binary string which in turn corresponds to a particular combination of subsets or subset identifiers. The high-frequency positions or combinations may be identified as representing true reduced dimension representations. In view 143, from the true reduced dimension representations, telemetry service 140 extracts the associated combinations of subsets or subset identifiers and performs various data analyses, for example, to understand the relationships between the metrics and to understand the behavior or distribution of the metrics according to various parameters.

Figure 2:
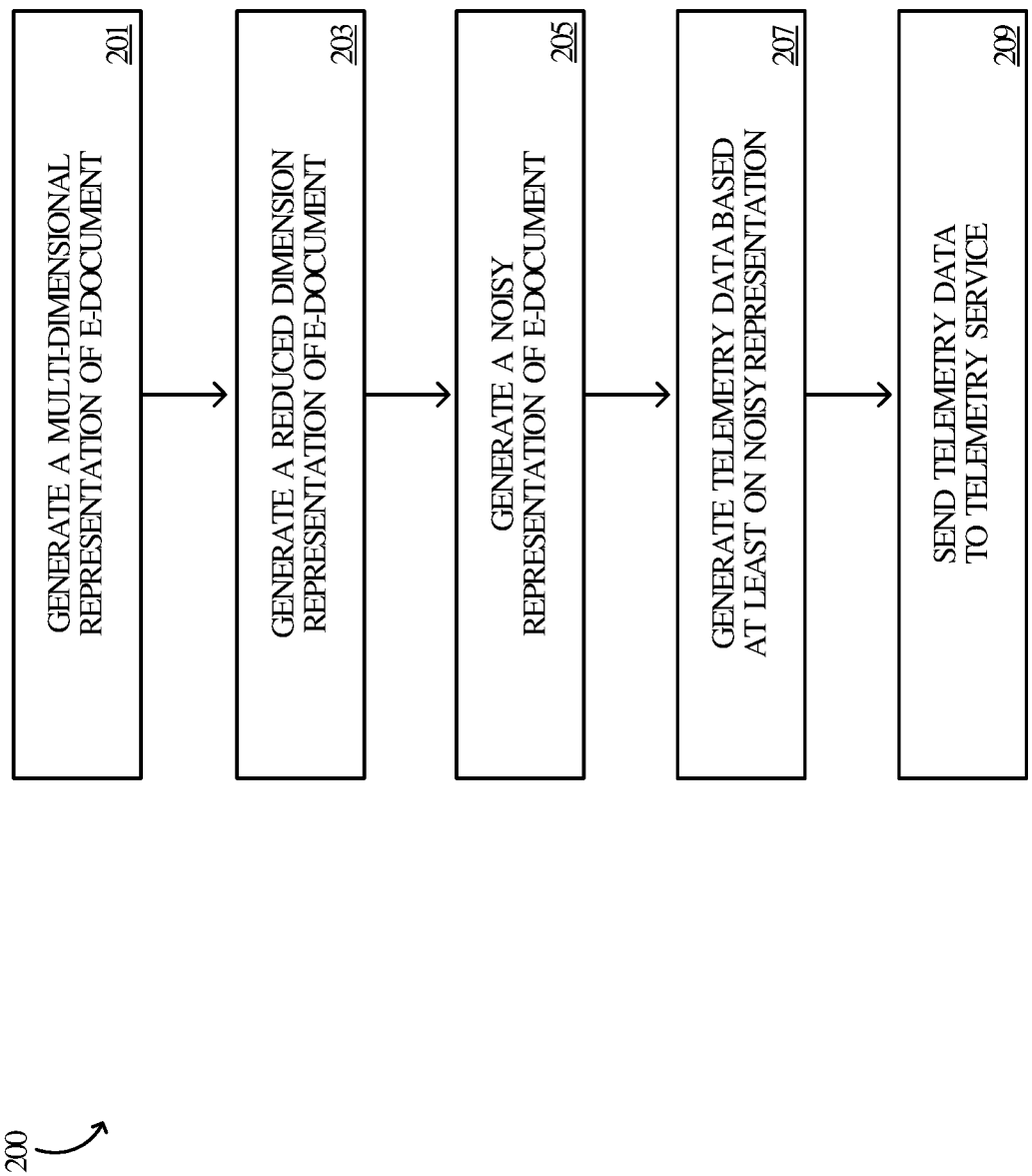
FIG. 2 illustrates a telemetry data process in an implementation.

FIG. 2 illustrates data logging process 200 in an implementation, hereinafter referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

In an implementation, a data logging service executing on a computing device collects data relating to an electronic document opened in a software application executing on the computing device. The data logging service generates a multi-dimensional representation of the document (step 201). The dimensions of the multi-dimensional representation correspond to characteristics of the document, such as document attributes or user activity in or on the document. The multi-dimensional representation of the document includes values indicative of characteristics of the document. In an implementation, the characteristics include quantifiable metrics, and the multi-dimensional representation includes values for the corresponding document.

Next, the data logging service generates from the multi-dimensional representation of the document a reduced dimension representation of the document (step 203). In an implementation, the reduced dimension representation includes document data in a format of fewer dimensions than the multi-dimensional representation. For example, the data logging service converts the values of the multi-dimensional representation to a single value, such as a binary number, binary string, or hashed value.

To generate the reduced dimension representation of the document, in an implementation, the data logging service first reduces the resolution of each of the data values of the multi-dimensional representation. For each data value of the multi-dimensional representation, the data logging service identifies a subset of values to which the value belongs from among a range of possible values for the corresponding document characteristic. Having identified a subset for the value, the data logging service then converts the value to a subset identifier which maps to otherwise represents the identified subset. In performing this type of conversion for every data value of the multi-dimensional representation, the data logging service forms a combination of the subset identifiers.

Next, the data logging service uses the combination of the subset identifiers to generate a single value which is uniquely representative of the combination. In an implementation, the data logging service maps the combination of subset identifiers to a unique identifier from a set of combination identifier values. The set of combination identifiers uniquely identifies every possible combination of subset identifiers. Thus, for any given combination identifier, a particular combination of subset identifiers can be identified.

In an implementation, a binary string can be used to represent the combination of subset identifiers by setting the number of positions of the string equal to the total number of possible combinations. Each of the positions of the binary string corresponds to a particular combination of subset identifiers. For a brief example, a dataset may include six document metrics, and the numbers of subsets for each metric may vary according to the range of possible values of the metric. If the number of possible subsets of the metrics is 5, 3, 4, 4, and 2, then the total number of possible combinations is 480. Thus, a binary string of 480 positions can be used to uniquely represent each of the 480 possible combinations by setting the position corresponding to a given combination to "1" and all other positions to "0."

Having created a binary string to represent the reduced dimension representation, the data logging service adds noise to the single value to generate a noisy representation of the document (step 205). In an implementation, the data logging service randomly selects and flips some of the "0" values of the binary string to "1" according to a predetermined probability. Adding noise to the binary representation further enhances protection of privacy of the document data by obscuring the true "1" from the randomly generated "1s."

The data logging service generates telemetry data based at least on the noisy representation of the document (step 207). For example, the data logging service may create a JSON object containing the noisy representation for transmission via an API (application programming interface) to a telemetry service. The data logging service then transmits the noisy representation of the document to a telemetry service (step 209). The telemetry service collects other similarly configured noisy representations for the document and for other documents from the data logging service and from other data logging services.

Figure 3:
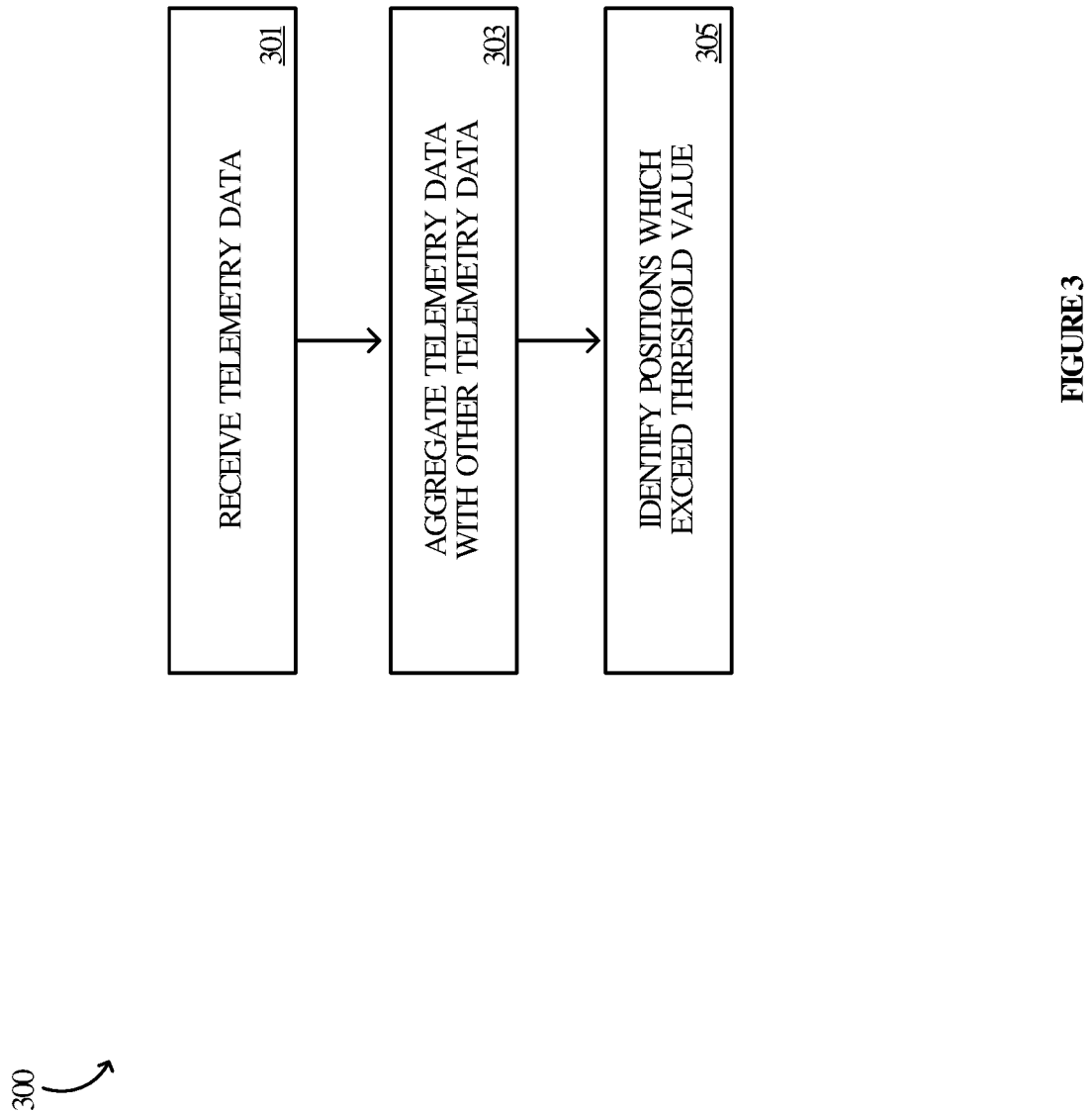
FIG. 3 illustrates a telemetry data process in an implementation.

FIG. 3 illustrates telemetry process 300 in an implementation, hereinafter referred to as process 300. Process 300 may be implemented in program instructions in the context of any of the software applications, modules, components, or other such elements of one or more computing devices. The program instructions direct the computing device(s) to operate as follows, referred to in the singular for the sake of clarity.

In an implementation, a telemetry service executing on a server computer receives telemetry associated with an electronic document from a data logging service executing on a computing device (step 301). In an implementation, the telemetry service interfaces with the data logging service via an API. The data logging service may be triggered to configure and transmit the telemetry data when a particular action is performed on or in the document, such as when the document is opened or saved, or when the user performs a particular action, such as adding a comment or inserting a hyperlink.

The telemetry service receives similarly configured telemetry data from multiple other data logging services executing on the same or other computing devices. To extract the document data from the noisy representations of the telemetry data from the various sources, the telemetry service aggregates the noisy representations to suppress or filter out the noise and reveal the true reduced dimension representations (step 303). In an implementation, the noisy representations are in the form of binary strings each containing an indication of the true combination (of subset identifiers) along with false indications of combinations pseudo-randomly added to the strings according to a predetermined probability. To remove or diminish the effects of the added noise, for each position of the binary strings, the telemetry service generates a sum of the values of the binary strings at the position. The telemetry service then identifies positions whose sums exceed a threshold value. The identified positions are indications of the true combinations (step 305). Having identified the true combinations of subset identifiers, the telemetry service can extract the subsets according to the subset identifiers. The combinations correlate the subsets of metric data and can be used to identify trends in the data.

In various implementations, the telemetry service or a related service specifies configuration requirements for the telemetry data according to the application. For example, the telemetry service may transmit to the data logging services a set of document characteristics for data captured from word processing application documents, and a different set of document characteristics for data captured from spreadsheet application documents. In addition to specifying the document characteristics, the telemetry service specifies the subsets for each metric. The subsets may be defined by boundary values. The telemetry service also specifies what event caused the data logging service to capture the document data.

In some implementations, the telemetry service or a related service updates the configuration requirements according to the telemetry data received. For example, the telemetry service may determine that the subsets fail to provide sufficient resolution to analyze a metric. Alternatively, the telemetry service may determine that the subsets are too granular to reveal a distribution of the data (i.e., the subsets flatten the data distribution). The telemetry service may update the subsets for the metric and deploy the updated subsets (or updated boundary values of the subsets) to the data logging services.

Returning to FIG. 1, the following is a brief example of processes 200 and 300 with respect to operational architecture 100. In an implementation, data logging service 120 executing on client computing device 110 generates a multi-dimensional representation of an electronic document opened in an application executing on client computing device 110. In a simplified illustration of the processes disclosed herein, the multi-dimensional representation comprises five metrics A, B, C, D, and E each of which may be a document attribute, or an action performed by the application or a user on the document. In generating the multi-dimensional representation, data logging service 120 captures raw data values 21, 7, 4, 2, and 9 for the five metrics, respectively, as shown in view 121.

Data logging service 120 generates a reduced dimension representation of the document based at least on the multi-dimensional representation of the document, as shown in view 122. In an implementation, data logging service 120 converts the data values to subset identifiers in a process of which reduces the resolution of the data. For each of the five data values, the subset identifier identifies a subset of values to which the data value belongs. The identified subset is one of multiple, non-overlapping subsets each representing a subset of values from the set of all possible values of the corresponding metric. In the simplified illustration, the raw data values are converted to subset identifiers 2, 1, 2, 1, and 3, which indicates that, for example, A=21 falls in the second subset for metric A, B=7 falls in the first subset of metric B, and so on.

Having converted the raw data values to subset identifiers, data logging service 120 determines a combination identifier ("612") for the particular combination of subset identifiers, that is, for subset identifiers 2, 1, 2, 1, 3. In an implementation, data logging service 120 maps the set of subset identifiers to a unique, single-valued combination identifier ("612") which uniquely identifies the combination from all the possible combinations of subset identifiers for the five metrics. Thus, a telemetry service receiving the combination identifier 612 can determine the subset identifiers for the document dataset.

In an implementation, the combination identifier is converted to a binary representation, such as a binary string or binary number. In an implementation, a binary string is configured to represent every possible combination of subset identifiers, that is to say, to have the same number of positions as there are possible combinations. To uniquely represent a combination, the position of the binary string corresponding to the combination is set to "1" while all the other positions are set to "0." In this way, the combination can be identified from the string by determining the position of the only "1" in the string.

Because the reduced resolution values (i.e., subset identifiers) can be obtained from the binary string, differential privacy methods can be used to further strengthen the privacy protection of the data. In an implementation, data logging service 120 randomly selects some positions of the binary string and flips the value of those positions from "0" to "1" according to a predetermined probability, as shown in view 123. The position of the string corresponding to the combination, already set to "1," is not changed. In an implementation, data logging service 120 ensures that some minimum number of additional positions is flipped. Because the randomized string contains multiple indications of a combination being represented, the true representation is obscured.

Data logging service 120 generates telemetry data based at least on the noisy representation of the document and transmits the telemetry data to telemetry service 140 executing on remote server computer 130. Remote server computer receives the telemetry data in the form of the noisy representation of the document, as shown in view 141. Telemetry service 140 aggregates the noisy representation with other, similarly configured noisy representations of other documents from other computing devices. In an implementation, to aggregate the noisy representations, telemetry service 140 generates a sum for each position of the binary strings to which noise was added. With each position corresponding to a particular combination of subset identifiers, the aggregation generates a frequency of occurrence of 1's for all the combinations. As shown in view 142, the frequencies of all the combinations will vary according to the captured document data but also according to the randomly added noise. Telemetry service 140 determines the combinations, for which the frequencies exceed a specified threshold value, as being indicative of true combinations of metric values. Outlier combinations of metric values will generally be obscured by the noise. The subsets of the combinations identified as being true can be extracted (as shown in view 143) for further analysis.

Figure 4:
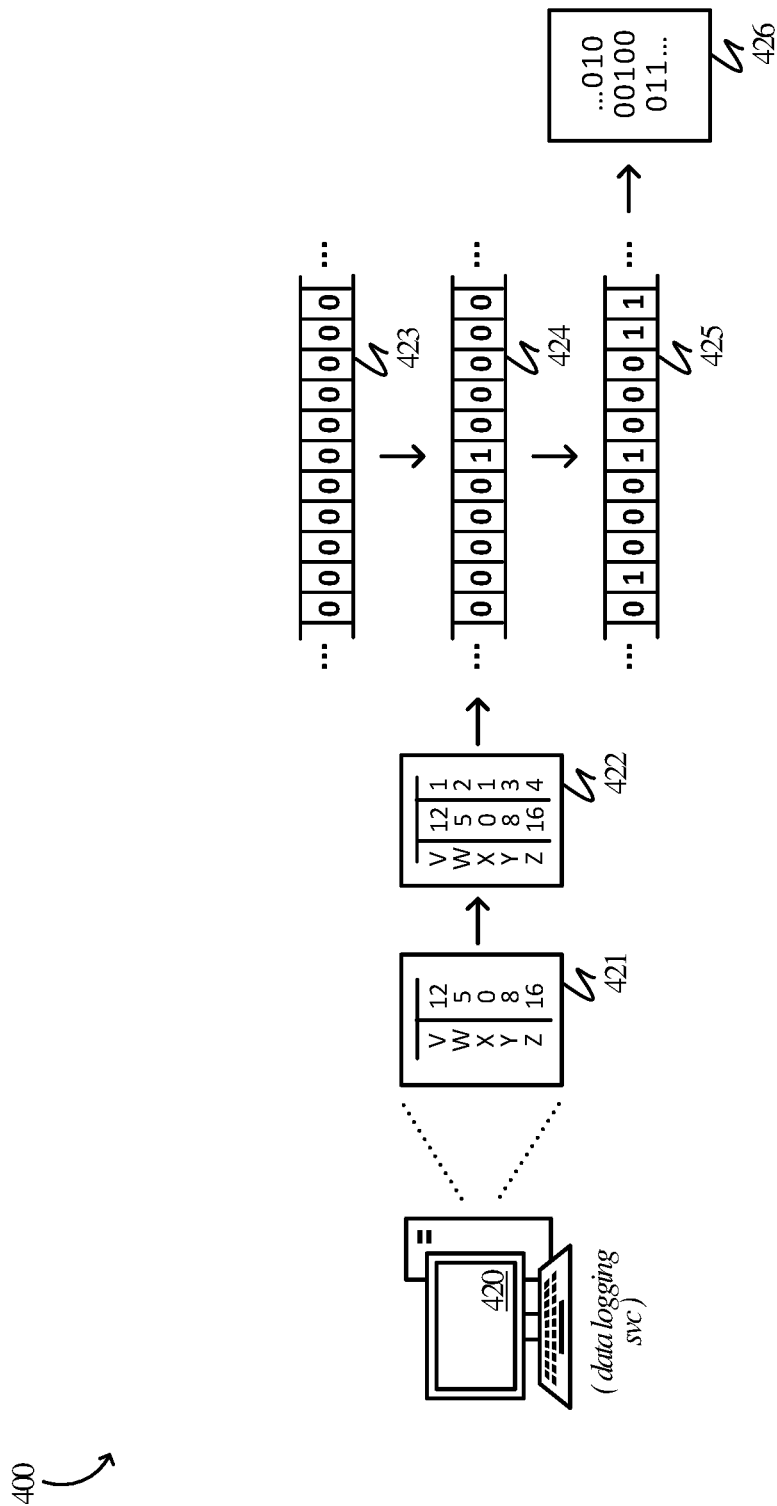
FIG. 4 illustrates an operational scenario of a telemetry data process in an implementation.

FIG. 4 illustrates telemetry data processes performed by data logging service 420, of which data logging service 120 in FIG. 1 is representative. Data logging service 420 executes on a client computing device in an implementation. Data logging service 420 captures data relating to a document which is open in an application executing on the computing device. Capturing the data may be triggered by an event which occurs in connection with the document, such as the selection by a user of an application command or function which has been instrumented to trigger data capture or by an action performed automatically by the application on the document, such as when the document is auto-saved.

In view 421, data logging service 420 has captured document data including five metrics for the electronic document. The metrics are characteristics of the document, such as document attributes or actions performed on the document by the user or by the application. In a simplified example of the concepts, five data values (12, 5, 0, 8, 16) are captured for five characteristics of the document (V, W, X, Y, and Z). The captured data set forms a multi-dimensional representation of the document.

In view 422, data logging service 420 converts the captured data values to new, reduced resolution values. The reduced resolution values are subset identifiers which identify subsets of data values into which the data values fall. For example, for metric V, the data value of 12 falls into the first subset of values for metric V. For metric Z, the data value 16 falls into the fourth subset of values for metric Z.

Data logging service 420 forms a reduced dimension representation of the document metrics data shown in view 421 based on the combination of subset identifiers (1, 2, 1, 3, 4). In an implementation, every possible combination of subset identifiers maps is uniquely identified. For example, any given combination of subset identifiers may be uniquely identified according to a serially numbered listing of every possible combination, where the serial numbers form a reduced dimension representation of the corresponding combination. Alternatively, a unique combination identifier for the combination may be algorithmically determined for any given combination based on the subset identifiers, forming another type of reduced dimension representation of the combination.

In an implementation, the combination of subset identifiers (e.g., 1, 2, 1, 3, 4) maps to a position in a binary string, where every position of the binary string maps to a particular combination of subset identifiers in a one-to-one correlation with every combination represented. For example, the combinations may be numbered from 1 to n, where n represents the total number of possible combinations of subset identifiers. A binary string of n positions will uniquely represent the ith combination (where i is number in the inclusive range 1 to n) by setting the ith position of the string to "1" and all the other n−1 positions to "0."

View 423 illustrates a portion of a binary string whose length is equal to the total number of possible combinations of subset identifiers for metrics a-c. All positions of the binary string are initially set to "0." View 424 illustrates generating of the binary string representation of the combination of subset identifiers (1, 2, 1, 3, 4), where the combination maps to a particular position on the binary string, and data logging service 420 flips that position to a value of "1." Thus, encoding the binary string according to the combination of subset identifiers as shown in view 424 forms a reduced dimension representation of the document.

In view 425, data logging service 420 strengthens the privacy protection of the data by randomly adding noise to the binary string. In an implementation, data logging service 420 randomly selects some of the positions of the binary string and then randomly determines whether to flip the value of that position from "0" to "1" according to a predetermined probability. In an implementation, data logging service 420 ensures that some minimum number of positions is flipped to ensure the position of the combination is sufficiently obscured. In view 426, data logging service 420 generates telemetry data based on the noisy representation for transmission to a telemetry service.

Figure 5:
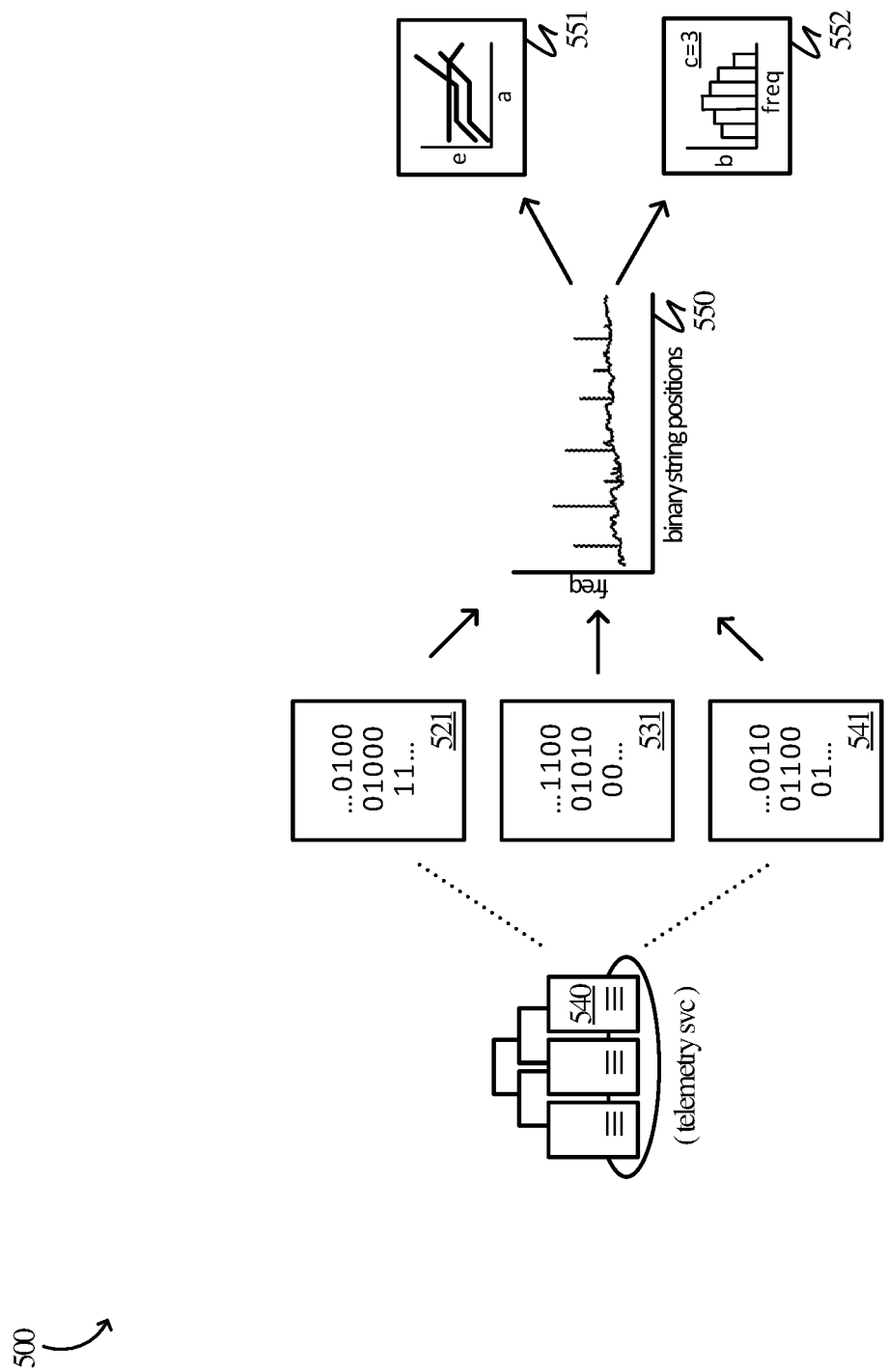
FIG. 5 illustrates an operational scenario of a telemetry data process in an implementation.

FIG. 5 illustrates telemetry data processes performed by telemetry service 540, of which telemetry service 140 in FIG. 1 is representative. Telemetry service 540 executes on a server computer in communication with a data logging service executing on a client computer remote from the service computer, such as data logging service 420 of FIG. 4, in an implementation. Telemetry service 540 captures data relating to a document which is open in an application executing on the client computing device.

Telemetry service 540 receives noisy representations of various documents from multiple data logging services. View 521, 531, and 541 are illustrative of multiple noisy representations received by telemetry service 540, where the noisy representations are randomized binary representations, such as binary strings to which noise has been randomly added. Telemetry service 540 aggregates the multiple noisy representations by summing the respective positions of the binary strings to determine a corresponding frequency of occurrence of the combinations represented by each the positions, as shown in view 550.

View 550 illustrates an example of the frequencies at which each position on the binary string is equal to 1 among all the aggregated noisy representations. Telemetry service 540 determines positions whose frequency is greater than a threshold value as being indicative of combinations of subset identifiers which actually occurred (rather than resulting from the randomly added noise). Combinations of subset identifiers are identified from the high-frequency positions. Telemetry service 540 extracts the subset identifiers and, thus, the subsets of the high-frequency combinations for further analysis, as illustrated in views 551 and 552. For example, the extracted data may be used to answer questions such as, "For users with rows and columns in a spreadsheet, with a certain range and who use a version of the application that is above X, what is the distribution of pivot tables created?"

Figure 6:
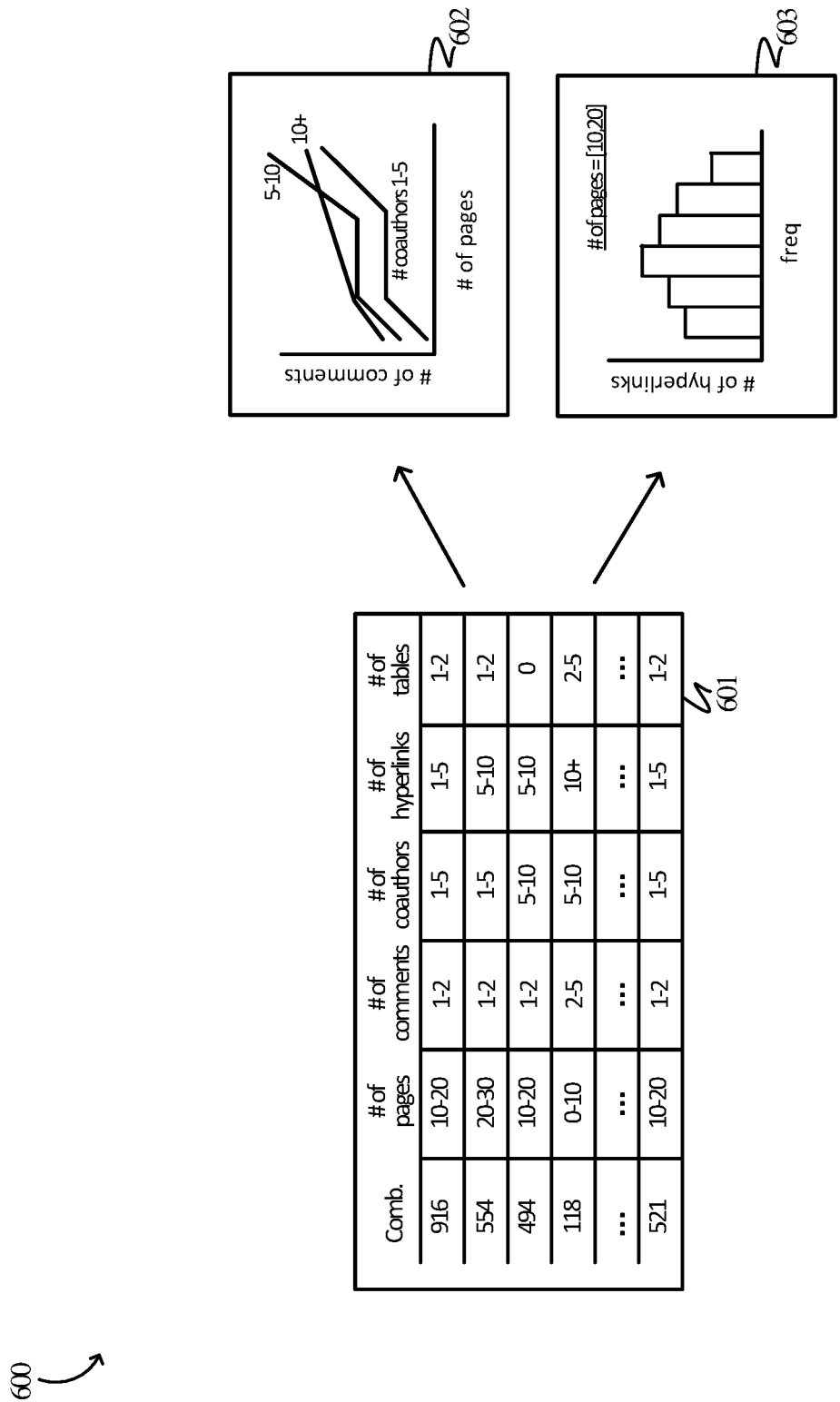
FIG. 6 illustrates a telemetry service process in an implementation.

FIG. 6 illustrates a telemetry data process of a telemetry service such as telemetry service 540 of FIG. 5. In an implementation, having extracted combination identifiers from high-frequency positions of the randomized binary strings, the telemetry service extracts the subsets corresponding to each of the combinations. For example, combination 494 corresponds to subset "10-20" for the number of page metric, "1-2" for the number of comments metric, "5-10" for the number of coauthors metric, and so on.

Because each combination correlates the data values (in the form of subsets of values) for the captured metrics, analyses can be performed to identify trends in the document data. For example, view 602 illustrates relationships between the number of comments metric and the number of pages metric according to the number of coauthors. Because the data extracted from the high-frequency combinations comprises subsets of values rather than a single value, some insight into the relationships between the metrics is lost. When too much insight is lost resulting in inconclusive results, the telemetry service may redefine the subsets for reprocessing the existing document data and for future data gathering. For example, when the bulk of the combinations report the same subset for a particular metric, the telemetry service may redefine the subsets of the metric to be more granular. If, on the other hand, the subsets are too granular, such that too few values fall within the subsets, the range of the subsets may be broadened to prevent singling out individual data points. In some implementations, the adaptive technique of re-querying the population with redefined subsets is applied iteratively until the number of data points within any given subset exceeds a threshold or k-anonymity value.

FIG. 7 illustrates computing device 701 that is representative of any system or collection of systems in which the various processes, programs, services, and scenarios disclosed herein may be implemented. Examples of computing device 701 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements telemetry data processes 706, which is (are) representative of the telemetry data logging, collection, and other processes discussed with respect to the preceding Figures, such as processes 200 and 300. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including telemetry data processes 706) may be implemented in program instructions and among other functions may, when executed by processing system 702, direct processing system 702 to operate as described with respect to the various operational scenarios, sequences, and processes illustrated herein. For example, software 705 may include program instructions for implementing a telemetry data process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support a telemetry data process in an optimized manner. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method comprising:
generating a multi-dimensional representation of an electronic document comprising values indicative of characteristics of the electronic document;
generating a reduced dimension representation of the electronic document based at least on converting the values to a single value;
converting the single value to a binary representation;
generating a noisy representation of the electronic document by at least modifying a portion of the binary representation;
generating an aggregation of the noisy representation of the electronic document with other ones of noisy representations of other electronic documents; and
identifying a reduced dimension representation of the aggregation based on identifying a position of the aggregation of the noisy representations that exceeds a threshold value.

2. The method of claim 1, wherein generating the reduced dimension representation of the electronic document comprises converting the values into subset identifiers of reduced resolution by, for each value in the multi-dimensional representation of the document:
identifying a subset of values to which the value belongs, from among a range of possible values for a characteristic of the electronic document; and
converting the value to a subset identifier of reduced resolution that is indicative of an identity of the subset.

3. The method of claim 2, wherein the range of possible values includes multiple subsets that are mutually exclusive with respect to each other, and wherein the subset of values to which the value belongs comprises one of the multiple subsets.

4. The method of claim 3, wherein the reduced dimension representation of the document comprises a combination identifier that uniquely identifies a combination of the subset identifiers from among a set of possible combinations.

5. The method of claim 4, wherein the binary representation comprises a string and wherein generating the reduced dimension representation of the electronic document based at least on converting the single value to the binary representation further comprises:
encoding the combination identifier at a position in the string, wherein the position in the string corresponds to the combination identifier.

6. The method of claim 5, wherein the string comprises a series of binary numbers, and wherein generating the noisy representation of the electronic document by at least modifying the portion of the binary representation comprises flipping at least some of the binary numbers in the string at positions other than the position in the string that corresponds to the combination identifier.

7. The method of claim 6, further comprising:
aggregating the noisy representation with other ones of noisy representations, wherein the other ones of noisy representations comprise strings of binary numbers, wherein positions of the binary numbers of the strings correspond to positions of the binary numbers of the string of the noisy representation, and wherein aggregating the noisy representation with other ones of the noisy representations comprises, for each position of the string, creating a sum of the binary value of the string and the binary values of the strings at a corresponding position of the strings; and
identifying positions of the string the sums of which exceed a threshold value.

8. The method of claim 7, further comprising:
for a given characteristic of the electronic document, defining boundary values of subsets of values according to the range of possible values for the given characteristic of the electronic document.

9. One or more computer-readable storage media having program instructions stored thereon that, when executed by one or more processors operatively coupled with the one or more computer-readable storage media, direct a computing device to:
generate a multi-dimensional representation of an electronic document comprising values indicative of characteristics of the electronic document;
generate a reduced dimension representation of the electronic document based at least on converting the values to a single value;
convert the single value to a binary representation;
generate a noisy representation of the electronic document by at least modifying a portion of the binary representation;
generate an aggregation of the noisy representation of the electronic document with other ones of noisy representations of the other electronic documents; and
identifying a reduced dimension representation of the aggregation based on identifying a position of the aggregation of the noisy representations that exceeds a threshold value.

10. The one or more computer readable storage media of claim 9, wherein to generate the reduced dimension representation of the electronic document, the program instructions direct the computing device to convert the values into subset identifiers of reduced resolution by, for each value in the multi-dimensional representation of the document:
identifying a subset of values to which the value belongs, from among a range of possible values for a characteristic of the electronic document; and
converting the value to a subset identifier of reduced resolution that is indicative of an identity of the subset.

11. The one or more computer readable storage media of claim 10, wherein the range of possible values includes multiple subsets that are mutually exclusive with respect to each other, and wherein the subset of values to which the value belongs comprises one of the multiple subsets.

12. The one or more computer readable storage media of claim 11, wherein the reduced dimension representation of the document comprises a combination identifier that uniquely identifies a combination of the subset identifiers from among a set of possible combinations.

13. The one or more computer readable storage media of claim 12, wherein the binary representation comprises a string and wherein to generate the reduced dimension representation of the electronic document based at least on converting the single value to the binary representation, the program instructions further direct the computing device to:

encode the combination identifier at a position in the string, wherein the position in the string corresponds to the combination identifier.

14. The one or more computer readable storage media of claim 13, wherein the string comprises a series of binary numbers, and wherein to generate the noisy representation of the electronic document by at least modifying the portion of the binary representation, the program instructions direct the computing device to flip at least some of the binary numbers in the string at positions other than the position in the string that corresponds to the combination identifier.

15. A computing apparatus comprising:
one or more computer-readable storage media;
one or more processors operatively coupled with the one or more computer-readable storage media; and
program instructions stored on the one or more computer-readable storage media that, when executed by the one or more processors, direct the computing apparatus to at least:
generate a multi-dimensional representation of an electronic document comprising values indicative of characteristics of the electronic document;
generate a reduced dimension representation of the electronic document based at least on converting the values to a single value;
convert the single value to a binary representation;
generate a noisy representation of the electronic document by at least modifying a portion of the binary representation;
generate an aggregation of the noisy representation of the electronic document with other ones of the noisy representations of other electronic documents; and
identify a reduced dimension representation of the aggregation based on identifying a position of the aggregation of the noisy representations that exceeds a threshold value.

16. The computing apparatus of claim 15, wherein to generate the reduced dimension representation of the electronic document, the program instructions direct the computing apparatus to convert the values into subset identifiers of reduced resolution by, for each value in the multi-dimensional representation of the document:

identifying a subset of values to which the value belongs, from among a range of possible values for a characteristic of the electronic document; and converting the value to a subset identifier of reduced resolution that is indicative of an identity of the subset.

17. The computing apparatus of claim 16, wherein the range of possible values includes multiple subsets that are mutually exclusive with respect to each other, and wherein the subset of values to which the value belongs comprises one of the multiple subsets.

18. The computing apparatus of claim 17, wherein the reduced dimension representation of the document comprises a combination identifier that uniquely identifies a combination of the subset identifiers from among a set of possible combinations.

19. The computing apparatus of claim 18, wherein the binary representation comprises a string and wherein to generate the reduced dimension representation of the electronic document based at least on converting the single value to the binary representation, the program instructions further direct the computing apparatus to:

encode the combination identifier at a position in the string, wherein the position in the string corresponds to the combination identifier.

20. The computing apparatus of claim 19, wherein the string comprises a series of binary numbers, and wherein to generate the noisy representation of the electronic document by at least modifying the portion of the binary representation, the program instructions direct the computing apparatus to flip at least some of the binary numbers in the string at positions other than the position in the string that corresponds to the combination identifier.

* * * * *